(12) United States Patent
Mitsuya et al.

(10) Patent No.: US 6,824,800 B1
(45) Date of Patent: Nov. 30, 2004

(54) METHOD OF PREPARING A POWDER COMPOSITION

(75) Inventors: Takayuki Mitsuya, Yokkaichi (JP); Kouichi Kitahata, Yokkaichi (JP); Kazuhiko Sugiura, Yokkaichi (JP); Senji Sakanaka, Yokkaichi (JP); Shoichi Ishigaki, Yokkaichi (JP)

(73) Assignee: Taiyo Kagaku Co., Ltd., Yokkaichi (JP)

(*) Notice: Subject to any disclaimer, the term of this patent is extended or adjusted under 35 U.S.C. 154(b) by 0 days.

(21) Appl. No.: 09/423,085
(22) PCT Filed: Mar. 2, 1998
(86) PCT No.: PCT/JP98/00872
§ 371 (c)(1), (2), (4) Date: Nov. 2, 1999
(87) PCT Pub. No.: WO99/44441
PCT Pub. Date: Sep. 10, 1999

(51) Int. Cl.[7] .............................. A23L 1/32; A23P 1/04
(52) U.S. Cl. ........................ 426/302; 426/305; 426/654; 426/614; 426/471
(58) Field of Search ................... 426/89, 96, 289, 426/293, 302, 321, 330.1, 534, 535, 654, 656, 471, 614

(56) References Cited

U.S. PATENT DOCUMENTS

| | | | |
|---|---|---|---|
| 2,786,766 A | * 3/1957 | Meusel | |
| 3,505,076 A | * 4/1970 | Maloney et al. | |
| 3,563,765 A | * 2/1971 | Melnick | 426/614 |
| 3,594,183 A | * 7/1971 | Melnick et al. | 426/573 |
| 3,881,034 A | * 4/1975 | Levin | 426/541 |
| 4,234,619 A | * 11/1980 | Yano et al. | 426/614 |
| 4,389,331 A | 6/1983 | Samejima et al. | 424/213.3 |
| 4,971,820 A | * 11/1990 | Likuski et al. | 426/281 |
| 5,037,661 A | * 8/1991 | Merchant et al. | 426/47 |
| 5,127,953 A | * 7/1992 | Hamaguchi | 106/504 |
| 5,139,787 A | * 8/1992 | Broderick et al. | 424/486 |
| 5,487,911 A | * 1/1996 | Ueda et al. | 426/614 |
| 5,514,401 A | * 5/1996 | Zeidler et al. | 426/429 |
| 6,309,623 B1 | * 10/2001 | Weers et al. | 424/45 |
| 6,565,885 B1 | * 5/2003 | Tarara et al. | 424/489 |

FOREIGN PATENT DOCUMENTS

| | | | | |
|---|---|---|---|---|
| DE | WO-9314649 A1 | * | 8/1993 | ........... A23L/1/015 |
| JP | A5665821 | | 6/1981 | |
| JP | A99878 | | 1/1997 | |
| JP | A1052234 | | 2/1998 | |
| JP | 11113533 | * | 4/1999 | |

OTHER PUBLICATIONS

Vogel et al., Fermentation and Biochemical Engineering Handbook, 1997, Noyes Publications, Second Edition, pp. 743 and 744.*
Perry et al., "Perry's Chemical Engineers' Handbook", 1997, McGraw–Hill, Seventh Edition, pp. 12–81 to 12–90.*
Patent Abstracts of Japan, 09009878, Jan. 14, 1997–Abstract Only.
Patent Abstracts of Japan—vol. 1995, No. 01, Feb. 28, 1995.
Patent Abstracts of Japan—vol. 16, No. 375, Aug. 12, 1992.

* cited by examiner

Primary Examiner—Milton I. Cano
(74) Attorney, Agent, or Firm—Birch, Stewart, Kolasch & Birch, LLP

(57) ABSTRACT

A powder composition, characterized in that the powder composition includes delipidated egg yolk particles and a functional food material, the functional food material being impregnated in pores of the delipidated egg yolk particles; a method for preparing a powder composition characterized by mixing a delipidated egg yolk with water, spray-drying the resulting mixture, to prepare porous, delipidated egg yolk particles having pores on surfaces thereof; and mixing the resulting delipidated egg yolk particles with a functional food material, and drying the resulting mixture under reduced pressure; and a food including the powder composition mentioned above. The powder composition of the present invention has excellent flowability and little stickiness, and the functional food material can be contained therein at a high concentration, so that the deterioration of the substances susceptible to undergo deterioration by light, heat, oxygen, or the like is prevented, whereby making the flavor of the substance having undesirable flavor better, and the properties of the functional food material are made stable for a long period of time.

7 Claims, No Drawings

METHOD OF PREPARING A POWDER COMPOSITION

This application is the national phase under 35 U.S.C. § 371 of PCT International Application No. PCT/JP98/00872 which has an International filing date of Mar. 2, 1998, which designated the United States of America.

TECHNICAL FIELD

The present invention relates to a powder composition. More specifically, it relates to a powder composition suitably used for foods, cosmetics, pharmaceuticals, and the like.

BACKGROUND ART

Since many of the biologically active substances used for foods, cosmetics, pharmaceuticals, and the like have poor flavor and undesired tastes, odors, and the like, it has been difficult to have intake of biologically active substances in an amount sufficient for exhibiting their effects. In addition, many of the biologically active substances are susceptible to denaturation and lose activity, and decomposition by heat, light, oxidation, or the like. Therefore, when these biologically active substances are tried to be used for foods, food materials, and the like in a dry state, there arises a problem that their activity is easily lost during the process of general process treatments such as drying, powdering, and the like.

For instance, with the fat-soluble provitamin β-carotene, there arise such problems that fading in the drying and powdering process takes place, and that nearly a half of its biological activity is lost. As a method for obtaining a stable β-carotene powder, there has been proposed a method comprising preparing inclusion compounds with cyclodextrin around liquid or pasty β-carotene, whereby increasing the stability of the β-carotene during powdering (Japanese Patent Laid-Open Nos. Sho 62-267261 and Hei 4-281754).

However, even when the above methods are employed, an effect of preventing oxidation degradation of the β-carotene by light or heat is insufficient, so that only a powder in which the β-carotene content is lowered can be obtained.

As described above, substances susceptible to undergo oxidation degradation require careful attention in process such as production, storage, manufacturing of preparation, requiring a complicated process, so that its application is largely limited.

In addition, since tea extract generally is bitter while having various excellent functional properties, it has been difficult to take the tea extract at high concentrations.

Therefore, the present inventors have developed a functional protein preparation obtained by adding an organic solvent such as ethanol to egg yolk power, delipidating the egg yolk, thereafter mixing the delipidated product obtained by drying in vacuo with a biologically active substance, and subsequently drying (Japanese Patent Laid-Open No. Hei 9-9878).

Although the functional protein preparation mentioned above has anti-oxidation ability and flavors of acceptable levels, since the biologically active substance is deposited on the surfaces of the delipidated product, the preparation is sticky, and operability such as measuring, mixing, filling, and the like of the resulting preparation cannot be said to be favorable. Therefore, the development of functional protein preparations with improvement in the stickiness mentioned above is desired.

DISCLOSURE OF INVENTION

An object of the present invention is made in view of the prior art described above, and is to provide a powder composition which has excellent flowability owing to its lowered stickiness and can contain a functional food material at high concentrations, thereby preventing the deterioration of the substances susceptible to undergo deterioration by light, heat, oxygen, or the like, in which the flavor of the substance having an undesired flavor is improved, whereby giving a powder composition in which the properties of the functional food material are stable for a long period of time.

According to the present invention, there is provided:

[1] a powder composition, characterized in that the powder composition comprises delipidated egg yolk particles and a functional food material, the functional food material being impregnated in pores of the delipidated egg yolk particles;

[2] a method for preparing a powder composition characterized by mixing a delipidated egg yolk with water, spray-drying the resulting mixture, to prepare porous, delipidated egg yolk particles having pores on surfaces thereof; and mixing the resulting delipidated egg yolk particles with a functional food material, and drying the resulting mixture under reduced pressure; and

[3] a food comprising the powder composition mentioned above.

BEST MODE FOR CARRYING OUT THE INVENTION

The powder composition of the present invention comprises delipidated egg yolk particles and a functional food material, the functional food material being impregnated in pores of the delipidated egg yolk particles.

The delipidated egg yolk used during the process of producing the delipidated egg yolk particles can be obtained by removing lipids from an egg yolk by a known method.

The egg yolk mentioned above is not particularly limited as long as it is one usually acceptable from the aspect of food hygiene. Examples of the egg yolk include raw egg yolk, egg yolk powder, sugared egg yolk, salted egg yolk, and the like. Among these egg yolks, the egg yolk powder obtained by drying by such a means as spray-drying can be favorably used in the present invention, from the viewpoint of easiness in handleability of the raw materials.

The method for removing the lipids from an egg yolk mentioned above is not particularly limited as long as it is a method usually employed in the manufacturing of foods. Examples of such methods include solvent extraction method, enzyme decomposition method, pressure extraction method, centrifugation method, supercritical extraction method, isolation method with an absorbent, and the like. Among these methods, the solvent extraction method is a method favorably employed in the present invention from the viewpoint of simplicity.

The solvent extraction method includes a method, for instance, comprising sufficiently stirring an egg yolk and a solvent with a stirring device such as a homomixer, and subjecting the mixture to solid-liquid isolation by filtration, centrifugation, or the like.

The solvent mentioned above is not particularly limited as long as it is one usually acceptable as food hygiene. Examples of the solvent include ethanol, acetone, hexane, and the like. Among these solvents, ethanol is favorably used in the present invention from the viewpoint of safety. The amount of the above solvent is not particularly limited, and it is desired that the amount is from 400 to 5,000 parts by weight or so, preferably from 1,000 to 3,000 parts by weight or so, based on 100 parts by weight of the raw material egg yolk on a solid basis, from the viewpoints of the delipidation efficiency from the egg yolk and the economic advantages.

The temperature during stirring the egg yolk mentioned above with the solvent is not particularly limited, as long as it is a temperature at which the solvent mentioned above is in a liquid state. It is desired that the temperature is usually from 10° to 80° C. or so, from the viewpoints of delipidation efficiency and safety when handling a solvent. In addition, the stirring time cannot be absolutely determined because it differs in accordance with the amounts of the egg yolk and the solvent, the ability of the stirring device, and the like. It is usually desired that the stirring is carried out until the egg yolk is sufficiently dispersed in the solvent.

The delipidated egg yolk can be obtained by stirring the egg yolk and the solvent in the manner described above, and thereafter subjecting the mixture to solid-liquid isolation by filtration, centrifugation, or the like.

The lipid content of the delipidated egg yolk is not particularly limited. It is desired that the lipid content is 10% by weight or less, preferably 5% by weight or less, of the solid ingredients of the delipidated egg yolk. The method for measuring the lipid content of the delipidated egg yolk is not particularly limited. Examples of such a method include usual method for measuring lipid content for foods such as methanol-chloroform liquid mixture method.

The properties of the delipidated egg yolk may be either powder or liquid.

In addition, the delipidated egg yolk may contain a solvent which can be used for food processing. The content of the above solvent is not particularly limited.

The delipidated egg yolk particles (particles constituting the delipidated egg yolk powder, usually referred to as "delipidated egg yolk particles") used in the present invention is prepared from the delipidated egg yolk. The method for preparing the delipidated egg yolk particles mentioned above includes a method, for instance, comprising mixing the delipidated egg yolk with water, spray-drying the resulting mixture, to prepare delipidated egg yolk particles having pores on the surfaces thereof. One of the largest features of the present invention resides in that there is employed an operation of mixing the delipidated egg yolk with water, and spray-drying the resulting mixture. Since such an operation is employed in the present invention, the resulting delipidated egg yolk particles are porous, on which surfaces there can be surprisingly formed a large number of pores (pore size being from about 0.1 to 10 $\mu$m) which cannot be found in the conventional delipidated egg yolk particles. In Japanese Patent Laid-Open No. Hei 9-9878, there is employed drying in vacuo. In this method, however, pores are not formed.

Water used during the manufacturing of the egg yolk particles mentioned above include, for instance, deionized water, tap water, distilled water, electrolytic water, and the like, and the present invention is not limited to those exemplified above.

It is desired that the mixing proportion of the delipidated egg yolk to water, based on 100 parts by weight of the delipidated egg yolk is such that the amount of water is usually 10 parts by weight or more, preferably 50 parts by weight or more, from the viewpoints of homogeneously dissolving and dispersing the delipidated egg yolk, and adjusting the balance of the hydrophilic groups and the hydrophobic groups on the surface of the delipidated egg yolk, and that the amount of water is 1,000 parts by weight or less, preferably 500 parts by weight or less, from the viewpoint of the efficiency during drying.

It is preferable that the mixing of the delipidated egg yolk with water mentioned above is usually carried out until which both ingredients are homogeneously dispersed. The resulting mixture thus obtained from the delipidated egg yolk and water is subsequently spray-dried.

The method for spray-drying mentioned above includes, for instance, a method for spraying from a high-pressure nozzle, and a method for spray-drying utilizing a centrifugal force, such as an atomizer. Incidentally, the hot air temperature during spray-drying is not particularly limited, as long as it is a dryable temperature. It is desired that the hot air temperature is usually from 50° to 200° C., preferably from 100° to 180° C. As a pressure when spray-drying using a high-pressure nozzle, a pressure from normal pressure to 240 kg/cm$^2$ can be employed. In the spray-drying employing a high-pressure nozzle, it is desired that the pressure is usually from 20 to 100 kg/cm$^2$. Incidentally, it is preferable that the above spray-drying is carried out until which the water content of the resulting delipidated egg yolk particles becomes 10% or less.

The delipidated egg yolk particles obtained in the manner described above are porous and have pores on the surfaces thereof as described above.

Subsequently, the resulting delipidated egg yolk particles are mixed with the functional food material.

The functional food material used in the present invention is not particularly limited. Examples of the functional food material include substances having an undesirable flavor, substances susceptible to deterioration, and the like.

The substances having an undesirable flavor mentioned above are not particularly limited. Examples of the above substances having an undesirable flavor include flavors pertaining to such tastes as bitter taste, pucker taste, hot taste, sour taste, and pungent taste, and in some cases sweet taste, tastiness (umami), and the like are also undesirable tastes. Examples thereof include substances having a flavor pertaining to odors such as fish odor, plant odor, fermented odor, rotten odor, animal odor, acidification odor, burning odor, sweet odor, and sour odor. These substances having an undesirable flavor may be natural ones or synthesized ones as long as they can be used for foods. In addition, each of the substances having an undesirable flavor may be used alone, or in admixture of two or more kinds.

The substances having a bitter taste or puckery taste mentioned above are not particularly limited. Examples of the above substances having a bitter taste or puckery taste include extracts derived from plants. Specific examples of the extracts derived from plants mentioned above include tea extracts, algae extracts, soybean extracts, quillate extracts, coffee bean extracts, and the like. Ingredients contained in these substances having a puckery taste include polyphenol compounds, isoflavone compounds, carotenoid compounds, saponin, caffeine, amino acids, inorganic salts, and the like. The inorganic salts mentioned above are not particularly limited. Examples of the above inorganic salt include iron salts, calcium salts, magnesium salts, zinc salts, sodium salts, potassium salts, phosphorates, and the like. These substances having a bitter taste or puckery taste can be used alone or in admixture of two or more kinds.

The substances having a hot taste mentioned above are not particularly limited. Examples of the substances having a hot taste include red pepper extracts, Japanese horseradish (wasabi) extracts, pepper extracts, ginger extracts, vanilla bean extracts, clove extracts, curry powder extracts, and the like. Ingredients contained in these substances having a hot taste include capsaicin, curcumin, and the like. These substances having a hot taste can be used alone or in admixture of two or more kinds.

The substances having a sour taste mentioned above are not particularly limited. Examples of the substances having a sour taste include citrus-based plant extracts such as lemon, organic acids, and the like. Ingredients contained in these substances having a sour taste include vitamin C, peppermint, citral, citric acid, and the like. These substances having a sour taste can be used alone or in admixture of two or more kinds.

The substances having a pungent taste mentioned above are not particularly limited. Examples of the substances having a pungent taste include tea extracts, algae extracts, soybean extracts, fish extracts, palm extracts, crude drug extracts, and the like. Ingredients contained in these substances having pungent taste include polyphenol compounds, carotenoid compounds, isoflavone compounds, docosahexaenoic acid, eicosapentaenoic acid, arachidonic acid, saponin, palm oil, vitamin E, linoleic acid, linolenic acid, and the like. These substances having a pungent taste can be used alone or in admixture of two or more kinds.

The substances having a sweet taste mentioned above are not particularly limited. Examples of the substances having a sweet taste include natural or artificial sweeteners. Specific examples of the substances having a sweet taste include aspartame, saccharin, dulcin, stevioside, acesulfame K, cyclo(sodium cyclamate), aritame, glycyrrhizine, rakan fruit, and the like.

The substances having tastiness mentioned above are not particularly limited. Examples of the substances having tastiness include organic acids, organic bases, acid amides, amino acids, peptides, nucleotides, glutamic acid, sodium glutamate, asparagine, glutamine, theanine, tricolominic acid, ibotenic acid, sodium inosinate, sodium guanylate, and the like.

The substances having a fish odor mentioned above are not particularly limited. Examples of the above substances having a fish odor include fish oil, algae extract oil, and the like. Ingredients contained in these substances having a fish odor include docosahexaenoic acid-containing mixtures, eicosapentaenoic acid-containing mixtures, arachidonic acid-containing mixtures, trimethylamine-containing mixtures, carotenoid-containing mixtures, and the like. These substances having a fish odor can be used alone or in admixture of two or more kinds.

The substances having a plant odor mentioned above are not particularly limited. Examples of the above substances having a plant odor include tea extracts, algae extracts, soybean extracts, quillate extracts, coffee bean extracts, garlic extracts, crude drug extracts, and the like. Ingredients contained in these substances having a plant odor include polyphenol-containing mixtures, carotenoid-containing mixtures, isoflavone-containing mixtures, docosahexaenoic acid-containing mixtures, eicosapentaenoic acid-containing mixtures, arachidonic acid-containing mixtures, saponin-containing mixtures, palm oil-containing mixtures, caffeine-containing mixtures, vitamin E-containing mixtures, and the like. These substances having a plant odor can be used alone or in admixture of two or more kinds.

The substances having a rotten odor mentioned above are not particularly limited. Examples of the above substances having a rotten odor include aminovaleral, aminovalerianic acid, and the like, which are ingredients for rotten odors in meat, fish, and the like.

The substances having a fermented odor mentioned above are not particularly limited. Examples of the above substances having a fermented odor include methylmercaptane, ethylmercaptane, methylmercaptopropyl alcohol, ethyl methylmercaptopropionate, butyric acid, and the like, which are contained in soybean paste (miso), soy sauce, cheese, and the like.

The substances susceptible to deterioration mentioned above refers to those substances having a property such that colors of the substances or activities such as chemical activity and biological activity are decreased or lost by light, heat, oxygen, or the like.

Examples of the substances susceptible to deterioration mentioned above include vitamins, pigments, perfumes, spices, fish oils, plant oils and derivatives thereof, compositions comprising these substances. These substances susceptible to undergo deterioration may be natural ones or synthesized ones as long as they can be used for foods. In addition, each of the substances susceptible to undergo deterioration may be used alone, or in admixture of two or more kinds.

Examples of the vitamins mentioned above include vitamin A's, carotenoids, vitamin B's, ascorbic acid, vitamin E's, vitamin K, and the like. Examples of the carotenoids include α-carotene, β-carotene, γ-carotene, lutein, lycopene, canthaxanthin, and the like. Examples of the vitamin E's include α-tocopherol, β-tocopherol, γ-tocopherol, δ-tocopherol, and the like.

Examples of the pigments mentioned above include anthocyanin pigments such as hibiscus pigment, red cabbage pigment, sweet potato pigment, and blueberry pigment; flavonoid pigments such as safflower pigment; carotenoid pigments such as potato pigment, dunaliella pigment, carrot pigment, and pigments derived from palm; chlorella pigment; turmeric pigment; naphthoquinone pigment, and the like.

Examples of the perfumes mentioned above include peppermint oil, beefsteak plant oil, spearmint oil, lavender oil, rosemary oil, cumin oil, clove oil, eucalyptus oil, lemon oil, orange oil, lime oil, rose oil, cinnamon oil, pepper oil, vanilla, ginger oil, and the like.

Examples of the spices mentioned above include spices extracted from capsicum, cardamon, mints, peppers, turmeric, cumin, sage, parsley, oregano, saffron, rosemary, thyme, and the like.

The fish oils are not particularly limited. Examples of the above fish oils include those fish oils extracted from whales, tunas, sardines, mackerels, salmons, and the like.

Examples of the plant oils mentioned above include plant oils extracted from palm, soybean, algae, rapeseeds, peanuts, sesames, coconut palm, and the like.

Examples of the derivatives of the plant oils mentioned above include hydrogenated oils such as palm hardened oil and soybean hardened oil.

As to the mixing proportion of the delipidated egg yolk particles to the functional food material mentioned above, it is desired that the amount of the functional food material in 100 parts by weight of the resulting powder composition is 5 parts by weight or more, preferably 10 parts by weight or more, from the viewpoints of increasing the content of the functional food material in the resulting powder composition and increasing economic advantages, and that the amount of the food functional material is 60 parts by weight or less, preferably 50 parts by weight or less, from the viewpoint of increasing the flowability.

In addition, when the delipidated egg yolk particles are mixed with the functional food material, an emulsifier may be further added in an appropriate amount from the viewpoints of improving the flowability and improving the dispersibility to water. The above emulsifier may be any kind as long as it can be used for foods. Representative examples of the emulsifier mentioned above include glycerol fatty acid esters, polyglycerol fatty acid esters, sucrose fatty acid esters, sorbitan fatty acid esters, propylene glycol fatty acid esters, lecithin, enzymatically decomposable lecithin, and the like. The amount of the emulsifier mentioned above cannot be absolutely determined because it differs in accordance with the kind of the emulsifier. For instance, in a case where a glycerol fatty acid ester is used as an emulsifier, the dispersibility to water can be improved by using the glycerol fatty acid ester in a proportion of 0.01 to 0.5 parts by weight, based on 100 parts by weight of the mixture (calculated as solid ingredients) of the delipidated egg yolk particles and the functional food material.

Further, in the present invention, when the delipidated egg yolk particles mentioned above are mixed with the functional food material, as occasion demands there may be appropriately added proteins such as soybean protein and milk protein; carbohydrates such as dextrin; and materials such as silica, calcium tertiary phosphate, calcium of egg shells, and minerals of milk sera. From the viewpoint of increasing oxidation stability, there may be appropriately added as antioxidants, for instance, lecithin, tea extracts, t-butylhydroxytoluene, t-butylhydroxyanisole, tocopherol, ethoxyquin, and the like.

The method for mixing the delipidated egg yolk particles and the functional food materials mentioned above, and ingredients such as other materials as occasion demands are not particularly limited, as long as these ingredients are homogeneously dispersed.

Next, the resulting mixture is dried under reduced pressure. One of the large feature in the present invention also resides in the employment of the procedure of drying the resulting mixture under reduced pressure. When the procedure as described above is carried, the functional food material is sufficiently impregnated into the pores of the surfaces of the delipidated egg yolk particles, as compared with those cases obtainable by other drying means.

Therefore, the delipidated egg yolk particles impregnated with the functional food material are less likely to be sticky and has excellent flowability.

An example of a method for drying the mixture mentioned above includes a method comprising drying the mixture under reduced pressure using a vacuum kneader, or the like. The pressure during the drying under reduced pressure is not particularly limited, and it is preferable that the pressure is usually 100 mmHg or less. In addition, the temperature during drying under reduced pressure is not particularly limited, and it is preferable that the temperature is usually 25° to 80° C. or so.

In addition, when drying under reduced pressure, it is preferable that drying is carried out with stirring the mixture mentioned above, from the viewpoint of homogeneously mixing the functional food material and the delipidated egg yolk particles, thereby facilitating the impregnation into the pores on the surfaces.

The drying of the mixture mentioned above is thus carried out. It is desired that drying is carried out to a point such that the water content contained in the mixture mentioned above is usually 10% by weight or less, preferably 5% by weight or less, in order to impart excellent flowability in the resulting powder composition.

Thus, there can be obtained a powder composition comprising particles in which the functional food material mentioned above is impregnated into the pores of the surfaces of the delipidated egg yolk particles.

It is desired that the average particle size of the particles constituting the powder composition of the present invention (as determined by observation with electron microscope) is usually from about 1 to about 100 μm, preferably from about 20 to about 60 μm, from the viewpoint of excellent dispersibility.

The powder composition of the present invention has excellent flowability, and gives excellent sense of fluidity when packed in a sack. The angle of repose of the above powder composition is 60° or less, preferably 50° or less, as determined by an analyzer for determining an angle of repose by Miwa-type cylindrical rotation method (manufactured by Tsutsui Rikagaku Kikai K. K.) under the conditions of a relative humidity of 40% and a temperature of 25° C., with proviso that the measurement is taken by adjusting the water content of the powder composition to 5±2% (determined by Karl Fischer's water content analyzer).

Since the powder composition of the present invention has the above angle of repose, its flowability is excellent, and its method for production is simple. Also, since the functional food material can be contained at a high concentration, there can be exhibited the effects that bacterial contamination or deterioration of the substances being susceptible to undergo oxidation deterioration is prevented, so that the properties of the functional food material are made stable for a long period of time.

Since the powder composition of the present invention has excellent flavors and palatabilities, is stable, and has excellent flowability, the powder composition can be widely used as food materials, and the like. The powder composition of the present invention may be, for instance, directly eaten in an appropriate amount with a spoon, or the like, or it may be added to a food, or the like. In addition, the powder composition may be eaten after being processed into baked confectionery such as cookies and biscuits, bread, fried products, curry, stew, ice cream, tablets, preparations, and the like.

The present invention will be described in further detail on the basis of the working examples, without intending to limit the present invention to these examples.

PREPARATION EXAMPLE 1

To 100 kg of egg yolk powder was added 2000 liter of ethanol, and the mixture was stirred with a homomixer at 40° C. for 30 minutes. The resulting mixture was filtered with a flat plate-type filtration apparatus using a filter paper. To the resulting filtration residue was added 200 kg of deionized water, and mixed. Thereafter, the mixture was dried with a spray-dryer (manufactured by Ohgawara Kakoki under the trade name of Model "DC16", inlet: 140° C., outlet: 75° C.), whereby giving 32 kg of delipidated egg yolk particles which were porous, having a large number of pores on the particle surface. The pores were confirmed with SEM. The pore size was such that the diameter was about 0.1 to about 10 μm. In the following Preparation Examples 2 to 4, the pores were similarly confirmed with SEM.

PREPARATION EXAMPLE 2

To 100 kg of egg yolk powder was added 2000 liter of ethanol, and the mixture was stirred with a homomixer at 40° C. for 30 minutes. The resulting mixture was filtered with a flat plate-type filtration apparatus using a filter paper. To the resulting filtration residue was added 100 kg of deionized water, and mixed. Thereafter, the mixture was dried with the spray-dryer in the same manner as in Preparation Example 1, whereby giving 32 kg of delipidated egg yolk particles which were porous, having a large number of pores (size: about 0.1 to about 10 μm) on the particle surface.

PREPARATION EXAMPLE 3

To 100 kg of egg yolk powder was added 4000 liter of ethanol, and the mixture was stirred with a homomixer at 40° C. for 30 minutes. The resulting mixture was filtered with a flat plate-type filtration apparatus using a filter paper. To the resulting filtration residue was added 300 kg of deionized water, and mixed. Thereafter, the mixture was dried with the spray-dryer in the same manner as in Preparation Example 1, whereby giving 31 kg of delipidated egg yolk particles which were porous, having a large number of pores (size: about 0.1 to about 10 μm) on the particle surface.

PREPARATION EXAMPLE 4

To 100 kg of egg yolk powder was added 1000 liter of ethanol, and the mixture was stirred with a homomixer at 40° C. for 30 minutes. The resulting mixture was extracted with a rotatable solid-liquid separator, to give an extraction residue. To the resulting extraction residue was added 400 kg of tap water, and mixed. Thereafter, the mixture was dried with the spray-dryer in the same manner as in Preparation Example 1, whereby giving 34 kg of delipidated egg yolk particles which were porous, having a large number of pores (size: about 0.1 to about 10 μm) on the particle surface.

EXAMPLE 1

In 8 kg of a soybean oil was homogeneously dispersed 5.5 kg of a tea extract (polyphenol content: 78% by weight, caffeine content: 9% by weight), and the resulting dispersion was added to 10 kg of the delipidated egg yolk particles obtained in Preparation Example 1. The mixture was stirred at 30° C. for 50 minutes with a vacuum kneader (manufactured by Kajiwara Kogyo K. K. under the trade name of KDV-5E; 30 mmHg), so that the dispersion was dispersed and impregnated thereinto, to give 23.5 kg of a powder composition (average particle size: 40 μm, water content: 4.2% by weight). The resulting powder composition had excellent flowability (evaluated with respect to sense of fluidity when packed in a sack, the same for the following Examples), was free from odor and bitter taste distinctively owned by the tea extract, and had excellent flavor.

EXAMPLE 2

In 12 kg of ethanol was homogeneously dispersed 8 kg of a tea extract (polyphenol content: 78% by weight, caffeine content: 9% by weight), and the resulting dissolved dispersion was added to 10 kg of the delipidated egg yolk particles obtained in Preparation Example 1. The mixture was stirred at 30° C. for 50 minutes with a vacuum kneader (30 mmHg) in the same manner as in Example 1, so that the dispersion was dispersed and impregnated thereinto, to give 18 kg of a powder composition (average particle size: 40 μm, water content: 3.4% by weight). The resulting powder composition had excellent flowability, was free from odor and bitter taste distinctively owned by the tea extract, and had excellent flavor.

EXAMPLE 3

To 10 kg of the delipidated egg yolk particles obtained in Preparation Example 2 was added 2 kg of a 30% β-carotene containing plant oil suspension having an distinctive odor. The mixture was stirred at 30° C. for 30 minutes with a vacuum kneader (30 mmHg) in the same manner as in Example 1, to give 12 kg of a powder composition (average particle size: 34 μm, water content; 5.1% by weight). The resulting powder composition had excellent flowability, was free from odor distinctively owned by the β-carotene, and had excellent flavor.

EXAMPLE 4

In 8 kg of a salad oil was suspended 4 kg of soybean isoflavone, and 10 kg of the delipidated egg yolk particles obtained in Preparation Example 2 was added to the resulting suspension. The mixture was stirred at 30° C. for 30 minutes with a vacuum kneader (30 mmHg) in the same manner as in Example 1, to give 22 kg of a powder composition (average particle size: 51 μm, water content: 4.7% by weight). The resulting powder composition had excellent flowability, was free from bitter taste distinctively owned by the soybean isoflavone, and had excellent flavor.

EXAMPLE 5

To 10 kg of the delipidated egg yolk particles obtained in Preparation Example 2 was added 2 kg of a ginger oil. The mixture was stirred at 25° C. for 30 minutes with a vacuum kneader (30 mmHg) in the same manner as in Example 1, to give 12 kg of a powder composition (average particle size: 38 μm, water content: 5.3% by weight). The resulting powder composition had excellent flowability, was free from odor distinctively owned by the ginger oil, and had excellent flavor.

EXAMPLE 6

To 10 kg of the delipidated egg yolk particles obtained in Preparation Example 1 was added 3 kg of a fish oil (DHA content: 25% by weight). The mixture was stirred at 30° C. for 1 hour with a vacuum kneader (30 mmHg) in the same manner as in Example 1, to give 12.8 kg of a powder composition (average particle size: 46 μm, water content: 5.6% by weight). The resulting powder composition had excellent flowability, was free from fish odor, and had excellent flavor.

COMPARATIVE EXAMPLE 1

To 10 parts by weight of the egg yolk powder was added 100 parts by weight of ethanol, and the mixture was stirred with a homomixer at 30° C. for 30 minutes. The resulting mixture was filtered with a filter press, and the resulting filtration residue was dried with a rotatable vacuum dryer, and thereafter classified with 40 mesh sieves. To 10 kg of the resulting delipidated egg yolk powder was added 3 kg of a fish oil (DHA content: 25% by weight), and the mixture was stirred with a supermixer so as to have a homogeneous state, to give 13 kg of powdery fats and oils. The resulting powdery fats and oils had slight fish odor and poor flowability. In addition, the delipidated egg yolk before adding the fish oil was examined by SEM. The surface had a shrinking state, and no pores were found thereon.

COMPARATIVE EXAMPLE 2

To 10 parts by weight of the egg yolk powder was added 100 parts by weight of ethanol, and the mixture was stirred with a homomixer at 30° C. for 60 minutes. The resulting mixture was filtered with a filter press, and the resulting filtration residue was dried with a rotatable vacuum dryer. To 10 kg of the resulting delipidated egg yolk powder was added a dispersion obtained from uniformly dispersing 5.5 kg of a tea extract (polyphenol content: 78% by weight, caffeine content: 9% by weight) in 8 kg of a soybean oil, and the mixture was stirred with a supermixer so as to have a homogeneous state, to give 23.5 kg of a powder (average particle size: 60 μm, water content: 5.9% by weight). The resulting powder composition had poor flowability. In addition, there was slightly found odor or bitter taste distinctively owned by the tea extract. The delipidated egg yolk powder before adding the tea extract was observed by SEM. As a result, the delipidated egg yolk powder had an irregular shape, and no pores were found thereon.

TEST EXAMPLE 1

An angle of repose for each 500 g of the powdery fats and oils obtained in Comparative Example 1 and the powder composition obtained in Example 6 was measured by an analyzer for determining an angle of repose by Miwa type cylindrical rotation method (manufactured by Tsutsui Rikagaku Kikai K. K.). The angle of repose for the powdery fats and oils obtained in Comparative Example 1 was 75°, and the angle of repose for the powder composition obtained in Example 6 was 50°. The water contents in the sample were 5.2% (Comparative Example 1) and 5.6% (Example 6), respectively.

TEST EXAMPLE 2

Panelists consisting of 5 each of male and female normal individuals of an age of 24 to 34 years old were subjected to sensory examination for "bitterness" with a tea extract, the powder compositions obtained in Examples 1 and 2, and powder obtained in Comparative Example 2 by placing 20 mg of each powder on the tongue. The evaluation criteria are as follows.

| Evaluation Scores | |
|---|---|
| 0 | No bitterness; |
| 1 | Slight bitterness; |
| 2 | Little bitterness; |
| 3 | Some bitterness; |
| 4 | Marked bitterness; and |
| 5 | Strong bitterness. |

The value obtained by dividing the total sum of the evaluation scores for "bitterness" for each individual panelists by the total number of the panelists (10 persons) was defined as sensory evaluation for "bitterness".

Results

| Results | |
|---|---|
| Sample | Evaluation Value for "Bitterness" |
| Tea Extract only | 4.8 |
| Powder Composition of Example 1 | 1.2 |
| Powder Composition of Example 2 | 1.8 |
| Powder of Comparative Example 2 | 3.8 |

It is clear from the above results that the powder compositions of Examples 1 and 2 of the present invention are powder compositions in which the exhibition of the undesirable flavor (bitterness) owned by the tea extract is suppressed.

TEST EXAMPLE 3

The powdery fats and oils containing a fish oil obtained in Comparative Example 1, the powder composition containing a fish oil obtained in Example 6, and the powdery fats and oils previously prepared by adding 3 kg of a fish oil (DHA content: 25% by weight) to 10 kg of cornstarch each in an open system were respectively stored at 60° C. in dark place. The POV measurement and the sensory examination were carried out with the passage of time. The mixture of cornstarch with a fish oil caused an unpleasant odor after 3 days, of which POV reached 80 meq./kg. The mixture of the powdery fats and oils obtained in Comparative Example 1 with a fish oil was stable after 10 days, but caused a slight unpleasant odor after 30 days, of which POV became 30 meq./kg. On the other hand, the powder composition containing a fish oil obtained in Example 6 caused no unpleasant odor even after 30 days, of which POV was as low as 0.5 meq./kg, showing no changes from the time of preparation.

Industrial Application

The powder composition of the present invention has excellent flowability and little stickiness, and the functional food material can be contained therein at a high concentration, so that the deterioration of the substances susceptible to undergo deterioration by light, heat, oxygen, or the like is prevented, whereby making the flavor of the substance having undesirable flavor better, and the properties of the functional food material are made stable for a long period of time. Therefore, the powder composition of the present invention can be suitably used for baked confectionery such as cookies and biscuits, bread, fried products, curry, stew, baby foods, tablets, preparations, capsules, and the like. In addition, the powder composition of the present invention may directly be eaten in an appropriate amount.

What is claimed is:

1. A method for preparing a powder composition, which method comprises the steps of:
   mixing 100 parts by weight of a delipidated egg yolk with 10 to 1000 parts by weight of water,
   spray-drying the resulting mixture at 50 to 200° C. to prepare porous, delipidated egg yolk particles having pores ranging in size from 0.1 to 10 µm on surfaces thereof,
   mixing the resulting delipidated egg yolk particles with a functional food material, which functional food material is selected from the group consisting of substances that have undesirable flavor and substances that are susceptible to deterioration, to provide a mixture containing the functional food material and the delipidated egg yolk particles, and
   drying the resulting mixture to a water content of 10 weight-% or less under reduced pressure, thereby providing food-impregnated Particles having an average particle size of from 1 to 100 µm.

2. The method of claim 1, wherein the mixture is dried under reduced pressure with stirring in the drying step.

3. The method of claim 1, wherein the egg yolk is delipidated by solvent extraction, enzyme decomposition, pressure extraction, centrifugation, super critical extraction, or isolation with an absorbent.

4. The method of claim 1, wherein the egg yolk is delipidated using ethanol in an amount of 400–5000 parts by weight per 100 parts by weight of raw material egg yolk.

5. The method of claim 1, wherein the spray-drying step dries the mixture to a water content of 10 weight-% or less.

6. The method of claim 1, wherein the mixture containing functional food material and delipidated egg yolk particles contains 5 to 60 weight-% food and 95 to 40 weight-% delipidated egg yolk.

7. The method of claim 1, wherein the drying step is conducted under a reduced pressure of 100 mm Hg or less.

* * * * *